(12) United States Patent
Darlet (10) Patent No.: US 10,875,234 B2
(45) Date of Patent: Dec. 29, 2020

(54) THIRD GENERATION PANTOGRAPH DEVICE FOR STRETCHING A THERMOPLASTIC FILM SIMULTANEOUSLY IN THE LONGITUDINAL AND TRANSVERSE DIRECTIONS

(71) Applicant: Jean-Pierre Darlet, Shanghai (CN)

(72) Inventor: Jean-Pierre Darlet, Shanghai (CN)

(73) Assignee: Jean-Pierre Darlet, Shanghai (CN)

( * ) Notice: Subject to any disclaimer, the term of this patent is extended or adjusted under 35 U.S.C. 154(b) by 20 days.

(21) Appl. No.: 15/728,708

(22) Filed: Oct. 10, 2017

(65) Prior Publication Data
US 2018/0326650 A1 Nov. 15, 2018

(30) Foreign Application Priority Data
May 15, 2017 (FR) ...................... 17 54255

(51) Int. Cl.
*B29C 55/16* (2006.01)
*B29C 55/20* (2006.01)
(Continued)

(52) U.S. Cl.
CPC ............ *B29C 55/165* (2013.01); *B29C 55/20* (2013.01); *B29K 2105/04* (2013.01);
(Continued)

(58) Field of Classification Search
CPC ... B29C 55/165; B29C 55/20; B29K 2105/04; B29K 995/0031; B29L 2011/0066; B29L 2031/3468
(Continued)

(56) References Cited

U.S. PATENT DOCUMENTS 3,014,234 A * 12/1961 Koppehele .............. B29C 55/20
264/290.2
3,114,929 A * 12/1963 Prietzschk ............ B29C 55/165
26/72
(Continued)

FOREIGN PATENT DOCUMENTS

JP        2011126024 A      6/2011

OTHER PUBLICATIONS

Preliminary Search Report and Annex relating to French Patent Application No. 1754255 dated Aug. 22, 2017 from French Republic of National Institute of Industrial Property.

*Primary Examiner* — Robert C Dye
*Assistant Examiner* — Guy F Mongelli
(74) *Attorney, Agent, or Firm* — M&B IP Analysts, LLC.

(57) ABSTRACT

A device for stretching a thermoplastic film simultaneously in the longitudinal direction and the transverse direction is provided. The device includes, on each side of the film (F) to be stretched, grasping members for grasping a lateral edge of the film (F), and guide members; first and second guide rails (R1, R2), on which the members and are respectively able to move; first connecting rods connecting the grasping members and the guide members. In an embodiment, each guide member is connected to a single grasping member by one or several of said first connecting rods, and is connected to a first longitudinal adjusting member by one or several second connecting rods connected to the first longitudinal adjusting member; and the device includes adjusting means for adjusting the position and orientation of said first longitudinal adjusting member relative to said first and second guide rail (R1, R2).

10 Claims, 6 Drawing Sheets

(51) Int. Cl.
*B29L 31/34* (2006.01)
*B29L 11/00* (2006.01)
*B29K 105/04* (2006.01)

(52) U.S. Cl.
CPC ............... *B29K 2995/0031* (2013.01); *B29L 2011/0066* (2013.01); *B29L 2031/3468* (2013.01)

(58) Field of Classification Search
USPC ...................................................... 425/403.1
See application file for complete search history.

(56) References Cited

U.S. PATENT DOCUMENTS

| | | | | |
|---|---|---|---|---|
| 3,148,409 | A | | 9/1964 | Gernot |
| 3,427,684 | A | * | 2/1969 | Tsien ........................ D06C 3/00 26/73 |
| 3,491,402 | A | * | 1/1970 | Koyama ................. B29C 55/20 26/73 |
| 3,598,371 | A | * | 8/1971 | Hyatt ....................... B29C 55/20 26/91 |
| 3,932,919 | A | * | 1/1976 | Hutzenlaub ........... B29C 55/165 26/73 |
| 5,072,493 | A | * | 12/1991 | Hommes ................ B29C 55/165 26/72 |
| 5,753,172 | A | * | 5/1998 | Forrest, Jr. ............ B29C 55/165 264/216 |
| 5,771,547 | A | * | 6/1998 | Hommes ................. B29C 55/20 26/93 |
| 5,939,845 | A | * | 8/1999 | Hommes ............... B29C 55/165 26/73 |
| 5,970,589 | A | * | 10/1999 | Hayashi ................ B29C 55/165 26/73 |
| 2006/0082022 | A1 | * | 4/2006 | Denker ................. B29C 55/165 264/290.2 |
| 2015/0314521 | A1 | * | 11/2015 | Baumeister ............... B29D 7/01 425/112 |
| 2016/0151960 | A1 | * | 6/2016 | Gumpinger ............. B29C 55/20 425/403.1 |
| 2016/0185032 | A1 | * | 6/2016 | Eckart ..................... B29C 55/20 425/403.1 |

* cited by examiner

THIRD GENERATION PANTOGRAPH DEVICE FOR STRETCHING A THERMOPLASTIC FILM SIMULTANEOUSLY IN THE LONGITUDINAL AND TRANSVERSE DIRECTIONS

TECHNICAL FIELD

The disclosed embodiments relate to a device for stretching a thermoplastic film simultaneously in the longitudinal direction and the transverse direction.

BACKGROUND

It is well known to stretch a film made from a synthetic thermoplastic material using a device simultaneously stretching the film in the longitudinal direction and the transverse direction, while the material of the film is made malleable by heating. This heating is in particular done by passing the film in a heating tunnel, in which the device is placed.

Such devices have therefore been known in principle for many years. They had practically disappeared due to the complexity of the devices making it possible to implement them, but have recently become topical again due to the development of several new types of films that can only be produced using simultaneous stretching methods. This is the case for films implementing resins with a high crystallization speed, which do not allow so-called sequential stretching, i.e., on devices in which the longitudinal stretching is done on a first machine, then the transverse stretching on a second machine, as is the case for many types of film using simple materials.

Other types of film have also appeared on the market, which generally take the form of a membrane, i.e., a film with a porosity. This porosity, for applications like those that are necessary to produce electric batteries, must be distributed regularly over the entire width of the produced film, which also does not allow sequential stretching, or nonadjustable simultaneous stretching, as has existed for several decades.

Figure 1:
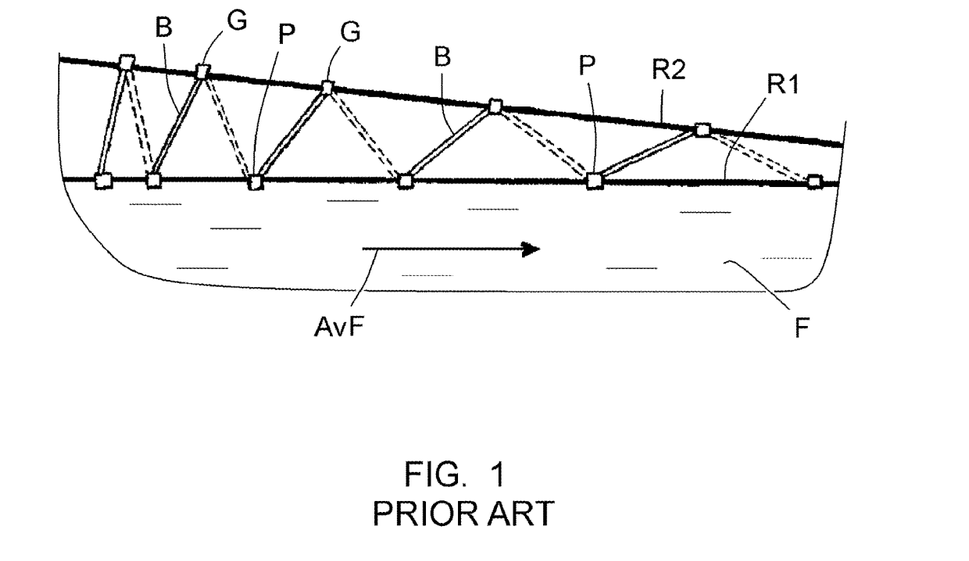
FIG. 1 is an illustration of the well-known "pantograph" principle.
Figure 2:
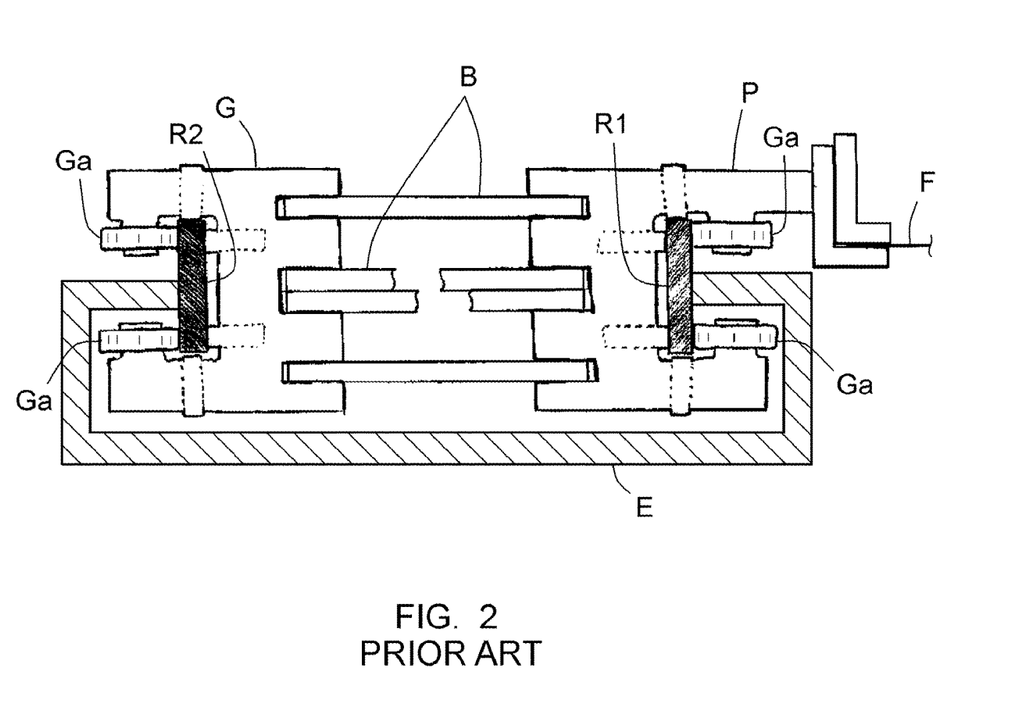
FIG. 2 is an enlarged, cross-sectional view of a known subassembly shown in FIG. 1.

All of the existing systems use the well-known "pantograph" principle, illustrated in the appended FIG. 1, which provides a very simplified illustration of one of the two subassemblies of the device situated on one side of the film F, allowing stretching of the film on one side. A subassembly identical to that shown in this FIG. 1 is placed on the opposite side of the film, symmetrically to this first subassembly with respect to the longitudinal median axis of the film F. As shown in FIGS. 1 and 2, members P for gripping the film F, in the form of clamps, and guide members G are positioned alternating on a first rail R1 close to the film F and on a second rail R2 further from the film, which are stationary relative to one another, these gripping members P and these guide members G being connected to one another by connecting rods B. The rail R2 is oriented so as to converge toward the rail R1 in the downstream direction relative to the direction of advance AvF of the film F, resulting in a gradual separation of the clamps P as the film advances, creating the desired longitudinal stretching by the opening of the connecting rods B making up the pantograph. FIG. 2 is a cross-sectional view of the aforementioned subassembly, enlarged, showing that the rails R1, R2 are connected to one another by a base E and the gripping members P and guide members G are guided on the rails by pairs of rollers Ga rolling on the inner and outer sides of the rails, as well as the upper and lower edges thereof.

Figure 3:
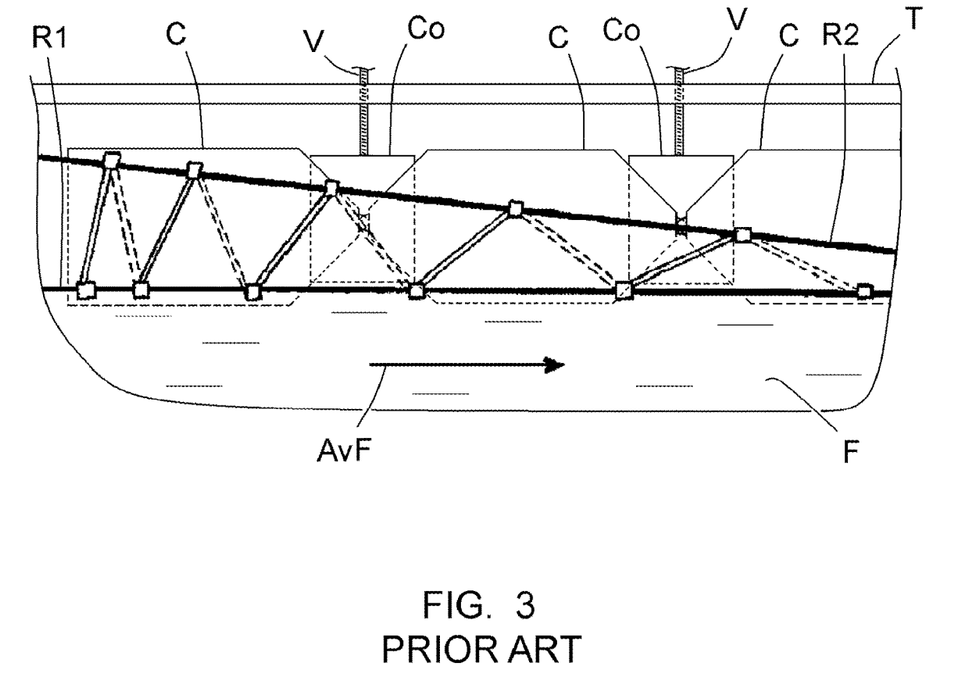
FIG. 3 is a view similar to FIG. 1, in which known means allowing elastic longitudinal deformation of rails are added.
Figure 4:
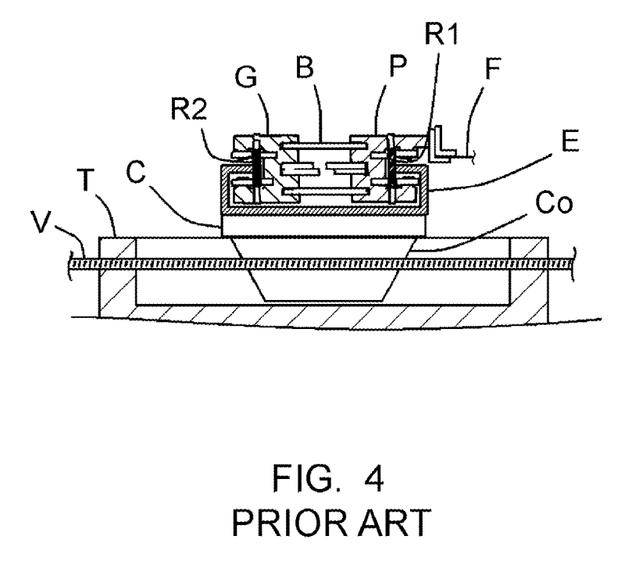
FIG. 4 is a cross-sectional view of said known subassembly and of said means allowing elastic longitudinal deformation of the rails.
Figures 5, 6:
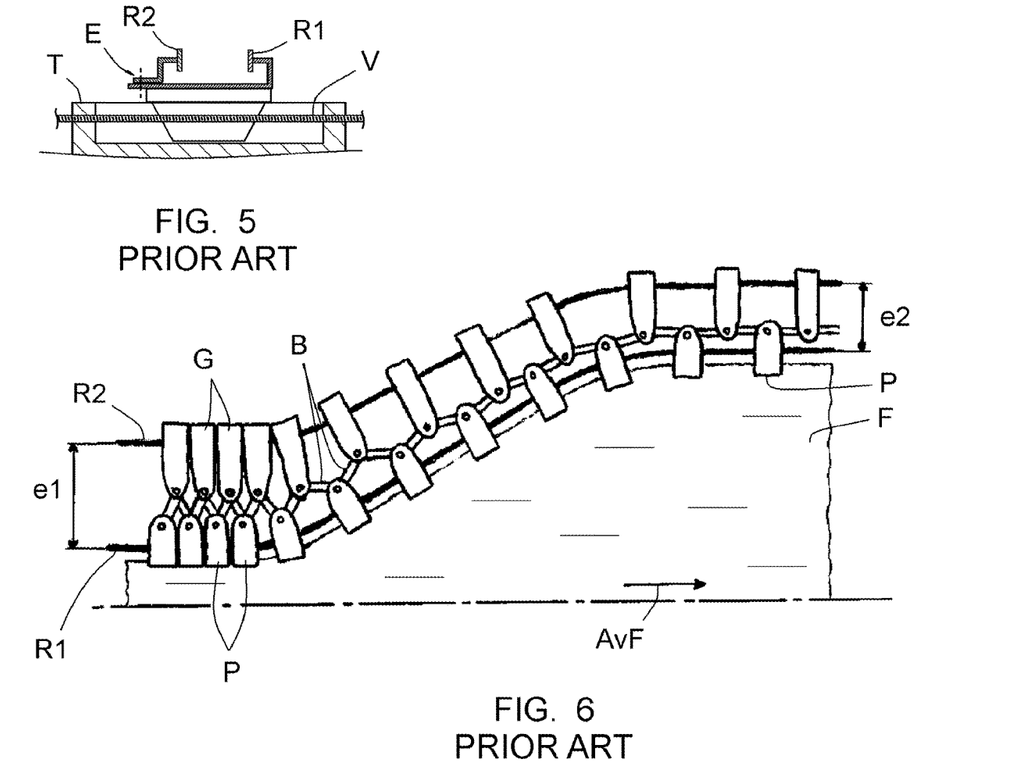
FIG. 5 is a view of the known subassembly similar to FIG. 4.
FIG. 6 is a simplified top view of a known device according to a first embodiment.
Figure 7:
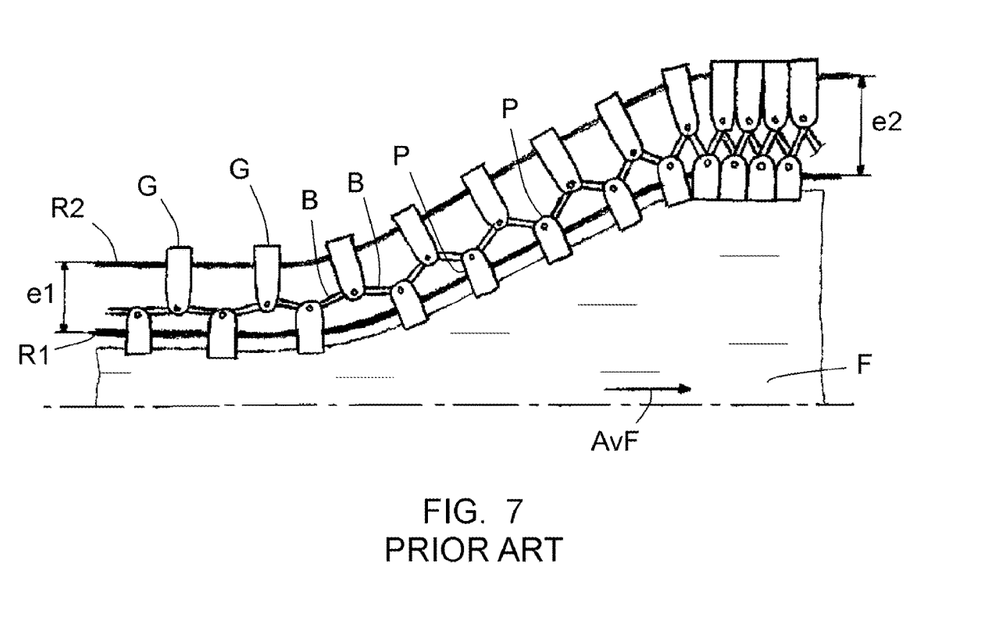
FIG. 7 is a simplified top view similar to FIG. 6 of a known device according to a second embodiment.

FIG. 3 is a view similar to FIG. 1, in which the means have been added allowing elastic longitudinal deformation of the rails R1, R2 with an inflection as shown in FIGS. 6 and 7, this inflection making it possible to perform the transverse stretching of the film F at the same time that the longitudinal stretching of this film is done. FIG. 4 shows the guide members G engaged on the rail R2, the connecting rods B connecting the guide members G and the gripping members P, the gripping members P engaged on the rail R1 and the base E of the rails R1 and R2. As shown in FIGS. 3, 4 and 5, the base E of the rails R1 and R2 is mounted on three successive independent frames C, which are connected to one another pivotably, the base E being interrupted at the portions of the rails R1, R2 that overlap the pivot links of the frames C to allow the deformation of the rails. The pivots along which the pivoting movements of the frames C are done are mounted on slides Co movable transversely via screws V wedged axially on a table T. FIG. 4 is a cross-sectional view of the subassembly.

These devices, which have been known for many years, called "first-generation", have the drawback that the longitudinal and transverse stretching rates are not adjustable, and are therefore not usable to produce the high-technology films recently developed.

To resolve this drawback, devices have been conceived, like those described in French patent application publication no. FR 2,849,801 (application No. 03 00400), in which the distance between the two guide rails R1, R2 is adjustable. For achieving this adjustment of this distance, the base E is in two parts, one part secured to the rail R1 and the other part secured to the rail R2, and members capable to be tightened, schematically shown in dash line, connecting said two parts one to the other. These two parts and members makes it possible to adjust the position of the rail R2 relative to the rail R1, as shown in FIG. 5, which is a view of the subassembly similar to FIG. 4. These devices, called "second-generation", effectively allow the adjustment of the transverse stretching rate, by adjusting the degree of divergence of the rails R1, R2 relative to the longitudinal median axis of the film, and the adjustment of the longitudinal stretching rate, by adjusting the distance between the rails R1 and R2. Also shown on FIG. 5, is one screw V identical to the one shown on FIG. 4 and previously described. FIG. 6 also shows connecting rods B, guide members G and gripping members P as previously described. As shown in this FIG. 6, which is a simplified top view of the subassembly, the distance between the two rails R1 and R2 becomes smaller in the downstream direction, the upstream mutual separation e1 of these rails being greater than the downstream mutual separation e2 of these same rails.

These devices have contributed to significantly reactivating the use of simultaneous stretching devices, but these applications have very quickly shown a certain number of limitations and drawbacks of these systems.

A first series of drawbacks of these second-generation systems results from the difficulty of making the divergence angles of the rails exactly symmetrical relative to the median axis of the film, and also the difficulty of making the distance between the rails R1 and R2 situated on one side of the film exactly symmetrical to the corresponding distances of the rails situated on the other side of the film. Such symmetry flaws result in the fact that two successive clamps P, which are located strictly opposite from one another in the part in which the rails R1, R2 are parallel, i.e., in a so-called preheating zone of the film, are not necessarily opposite from one another in the transverse stretching zone, in which the rails diverge, which has a negative impact on the stretching of the film. This difficulty is heightened by the need to provide mechanical play between the rails R1 and the clamps P.

This type of difficulty appeared drastically when these devices were used for so-called optical films, for which a very precise adjustment is required regarding the orientation angles of the polymer crystals, which directly affect the optical refraction index of the films (stretching at 90° or at 45°).

A second difficulty appeared when these second-generation devices were used to manufacture membranes used to form high-performance batteries, in particular for the automotive industry, as well as certain optical films, for which it must be possible to simultaneously have positive transverse stretching (done by divergence of the rails) cohabitate with so-called negative longitudinal stretching (i.e., two successive clamps P come closer together, and not further apart), thus achieving a longitudinal compression of the film. Such negative longitudinal stretching, or longitudinal compression of the film, in these second-generation devices, can only be obtained by moving the rails R1 and R2 away from one another in the downstream direction, as visible in FIG. 7, and no longer closer together, as is the case during so-called positive stretching; the clamps P, during their movement, if possible at a high speed, must not descend along the converging rails R1, R2, but on the contrary rise along the diverging rails R1, R2, as shown in FIG. 7. This FIG. 7 also shows connecting rods B, guide members G and gripping members P as previously described. The movement of the clamps P creates the appearance of considerable forces, and in some cases, an impossibility of using the devices with the stretching rates required by the method.

To resolve the drawback of the appearance of excessive forces on the guide members during the use of negative longitudinal stretching rates, i.e. of longitudinal compression of the film, additional driving devices have been conceived, the principle of which is to install a gearwheel directly driving the clamps to help their movement when these substantial forces appear. These devices are not satisfactory solutions, given that by definition, the gearwheel has a fixed number of teeth, the separation of which must strictly correspond to the separation of the clamps that they drive, which conducts to add an additional driving device that itself is not adjustable to a device that must, by definition, be adjustable. As a result, for any modification of the stretching rate, the gearwheel responsible for the complementary driving must be replaced, which is complex and tedious to do.

Another type of difficulty appeared in so-called second-generation devices when it was necessary to use simultaneous stretching systems to manufacture membranes involving certain types of polymers for which the desired porosity can only be obtained by using extremely high longitudinal stretching rates, which may reach 1:40 or 1:50, therefore very far from the traditional stretching rates, which are about 1:7 to 1:10 at the very most. Indeed, in the second-generation systems, the maximum longitudinal stretching rate authorized by the system is directly related to the length of the connecting rods that connect the clamps to the guide members.

The need to reach very high values of the longitudinal stretching rate would therefore make it necessary, on the systems, to have an excessive elongation of the connecting rods and therefore a corresponding separation of the front rail and the rear rail, which, in light of the play necessary for the movement, would make the operation of such a system impossible.

Various objects of the disclosed embodiments aim to resolve all of the aforementioned drawbacks of the existing devices.

One aim of the disclosed embodiments is therefore to provide a device allowing an adjustment of the longitudinal and transverse stretching rates not posing the aforementioned difficulties of obtaining perfect symmetry in the positions of the rails relative to the median axis of the film and the positions of the rails relative to one another on each side of the film.

Another aim of the disclosed embodiments is to provide a device having a substantial increase in the possible longitudinal stretching rates, and in particular reaching extremely high disclosed embodiments stretching rates, up to 1:40 or 1:50.

Still another aim of the invention is to provide a device making it possible to simultaneously implement positive transverse stretching, by divergence of the rails, and a so-called negative longitudinal stretching rate, i.e., two successive clamps coming closer together, without the appearance of considerable forces to move the clamps, and without making additional systems necessary to move the clamps, in particular with gear wheels.

SUMMARY

The device, disclosed herein, comprises on each side of the film to be stretched, grasping members for grasping a lateral edge of the film, in particular in the form of clamps; a first guide rail, close to the film, on which these grasping members are placed and along which these grasping members are able to move; guide members; a second guide rail, on which these guide members are placed and along which these guide members are able to move; this second rail is rigidly connected to said first rail, in that its position is not adjustable relative to this first rail in a direction transverse to the film; and first connecting rods connecting the grasping members and the guide members, the first connecting rods being movable relative to these grasping members and these guide members along first axes; on each side of the film, each guide member is connected to a single grasping member by one or several of said first connecting rods, and is connected to a first longitudinal adjusting member by one or several second connecting rods, this or these second connecting rods being movable relative to the guide member and relative to this first longitudinal adjusting member along second axes parallel to said first axes; said second connecting rod(s) of a first guide member and said second connecting rod(s) of a second guide member consecutive to said first guide member are connected to said first longitudinal adjusting member at pivot points that are combined or close on this first longitudinal adjusting member; and the device includes adjusting means for adjusting the position and orientation of said first longitudinal adjusting member relative to said first and second guide rails.

Thus, the invention consists of finding a way to return to a solution with rails whose position is not adjustable relative to one another in a direction transverse to the film, so as to solve the aforementioned symmetry problems raised by a so-called "second-generation" device, while conceiving the system of said first and second connecting rods, by which two consecutive grasping members are no longer connected to a single guide member by said first connecting rods, but to two consecutive guide members by these same first connecting rods, the two consecutive guide members being connected to one another by said second connecting rods, the opening or closing of which being controlled and guided using said first adjusting member, the position and the orientation of this first adjusting member relative to the rails being able to be adjusted.

This first longitudinal adjusting member, when it is positioned far away from said second rail, closes the angle formed by said second connecting rods and therefore brings the two consecutive guide members closer together, and, when it is positioned close to said second rail, opens the angle formed by said second connecting rods and therefore separates the two consecutive guide members. The lengths of the second connecting rods are therefore added to the lengths of the first connecting rods for the maximum possible gap between two consecutive grasping members and thus make it possible to obtain a substantially higher longitudinal stretching rate relative to what was achieved by the existing devices.

The orientation of the first longitudinal adjusting member relative to the rails makes it possible to influence the evolution of the gap between the grasping members along the rails, and therefore to adjust the longitudinal stretching rate of the film. Thus, provided that the second rail comes closer to said first rail in the downstream direction in the direction of advance of the film, and provided said first longitudinal adjusting member is situated between the two rails, an orientation of this first longitudinal adjusting member strictly parallel to said second rail will have no impact on the evolution of the gap between the successive pairs of grasping members; the orientation of the first longitudinal adjusting member such that this first adjusting member comes closer to said second rail in the downstream direction will produce gradual opening of the angle between the successive pairs of second connecting rods in this downstream direction and will therefore lead to an increase in the longitudinal stretching rate; the orientation of the first longitudinal adjusting member such that this first adjusting member moves away from said second rail in the downstream direction will cause gradual closing of the angle between the successive pairs of second connecting rods in this downstream direction and will therefore produce a decrease in the longitudinal stretching rate.

When it is desired for the device to make it possible to gain a negative longitudinal stretching rate, i.e. a longitudinal compression of the film, the elongated adjusting member is positioned so as to allow a partial opening of said second connecting rods in a zone of the device in which there is no necessity to perform longitudinal stretching of the film, in particular in the preheating part of the oven making it possible to make the material of the film malleable, then so as to gradually close said second connecting rods in a zone of the device in which there is cause to implement said negative longitudinal stretching rate.

The disclosed embodiments thus provide a device that may be described as "third-generation", consisting of keeping the well-known advantages of the "first-generation" pantograph mechanical system, and completely separating the function of guiding the moving assembly embodied by the grasping members and the connecting rods, and the function of adjusting the longitudinal stretching rate.

Preferably, on each side of the film, the device comprises a second elongated adjusting member and a series of third connecting rods, respectively homologous to said first elongated adjusting member and said second connecting rods, this second elongated adjusting member and this series of third connecting rods being situated on one side of the grasping members, first connecting rods and guide members that is opposite the side of these same grasping members, first connecting rods and guide members on which are located said first elongated adjusting member and the series of said second connecting rods.

This second elongated adjusting member and this series of third connecting rods allow better distribution of the forces and operation of the system with no cantilevered forces being exerted.

According to one possibility, each pair of said second connecting rods extends between the two said first connecting rods associated with the same guide members as this pair of second connecting rods. In this case, said first elongated adjusting member, and if applicable said second elongated adjusting member, can be in the form of a rail with an upside down U-shaped section, forming a guide slot for guiding the pivot which connects the two connecting rods of each pair of second connecting rods to one another.

According to another possibility, each pair of second connecting rods extends over the side of said second rail opposite said first rail. In this case, said first elongated adjusting member can be in the form of a rail similar to said first or second rails, having guide parts engaged on it and movable on it, each of these guide parts being secured to a pivot on which said second connecting rods are pivotably mounted.

Preferably, the device comprises a first linear motor associated with said first longitudinal adjusting member, and if applicable, a second linear motor associated with said second longitudinal adjusting member, acting on each junction point of said second connecting rods so as to assist the movement of these second connecting rods along said longitudinal adjusting member during the longitudinal stretching operation of the film.

This linear motor makes it possible to assist this movement of the second connecting rods when the force necessary to obtain the opening or closing of the connecting rods is substantial, as is for example the case when treating a thick optical film.

The disclosed embodiments will be well understood, and other features and advantages thereof will appear, in reference to the appended diagrammatic drawing, showing, as non-limiting examples, several embodiments of the device in question. In this drawing:

DESCRIPTION OF THE PREFERRED EMBODIMENTS

FIGS. 1-7 show devices according to the prior art and have been described above.

Figure 8:
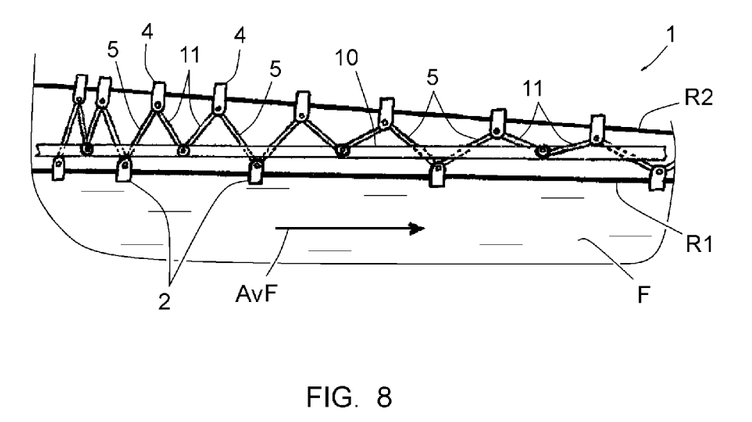
FIG. 8 is a very simplified top view of one of the subassemblies making up this device situated on a lateral side of the film to be stretched, according to a first embodiment.

FIG. 8 shows one of the lateral subassemblies 1 comprised by a device for stretching a thermoplastic film F on one side of this film, the device including a second subassembly, identical to the illustrated first subassembly 1, arranged on the other side of the film F, symmetrically to this first subassembly 1 relative to the longitudinal median axis of the film F.

Figure 9:
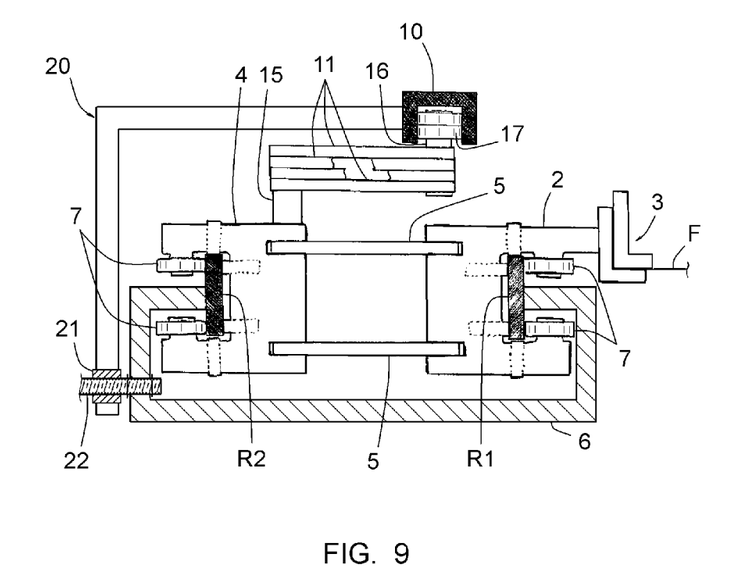
FIG. 9 is an enlarged cross-sectional view of this subassembly, according to a first implementation.

It will be understood that this FIG. 8 resembles FIG. 1, and FIG. 9 resembles FIG. 2; they include:
the film F;
the arrow AvF depicting the direction of advance of the film F in the heating tunnel making it possible to make the material of this film malleable;
the first and second guide rails R1, R2; the second rail R2 converges toward the first rail R1 towards the downstream direction;
the grasping members 2, including clamps 3 for grasping a lateral edge of the film F, engaged on the first rail R1;
the guide members 4 engaged on the second rail R2;
first pairs of connecting rods 5 connecting a grasping member 2 to a guide member 4;
the base 6 connecting the rails R1, R2 to one another; and
rollers 7 equipping the grasping members 2 and the guide members 4 and rolling against the inner and outer faces and the upper and lower edges of these rails.

The subassembly is also equipped with the same means as those previously described in reference to FIGS. 3 and 4 (articulated frames C, slides Co, screws V and table T) so as to make it possible to produce an inflection of the rails R1, R2 like that shown in FIGS. 6 and 7 to allow stretching of the film F in a direction transverse to the direction of advance of this film.

As illustrated, unlike FIG. 1, each guide member 4 is connected to a single grasping member 2 by a single pair of superimposed connecting rods 5, hereinafter called "first connecting rods", which is connected to an adjusting beam 10, also referred to as adjusting member 10, by a pair of second connecting rods 11, having a length smaller than that of the first connecting rods 5.

The first axes along which the first connecting rods 5 are movable relative to the corresponding grasping member 2 and guide member 4 are parallel to the second axes along which the second connecting rods 11 are movable with respect to the corresponding guide members 4 and the adjusting beam 10.

On the side of the guide member 4, the second axis is formed by a pivot 15, and, on the opposite side, this second axis is formed by a pivot 16 on which two rollers 17 are mounted, these rollers being received and able to roll inside a slot formed by the beam 10.

As shown in FIG. 9, the beam 10 has an upside down U-shaped cross-section, in order to form said slot. This beam 10 has openings arranged in its central wall, in portions overlapping articulations of the frames C as shown in FIG. 3; these openings allow the transverse deformation of this beam 10 such that it can follow the inflection given to the rails R1 and R2 to perform transverse stretching of the film F.

The beam 10 is connected to posts 20, arranged at identical or similar intervals along the length of this beam. The base of the upright of each post 20 is secured to a nut 21 traversed by a screw 22 perpendicular to the direction of advance AvF of the film F; this screw 22 traverses the flank of the base 6 bearing the second rail R2 and is rotatable relative to this flank while being stopped relative thereto in the axial direction, for example by pins. Each screw 22 is connected to means for maneuvering it in rotation, such as a wheel or a motor; the actuation of the different screws 22 in one rotation direction or the other of these screws makes it possible to move the assembly formed by the posts 20 and the beam 10 in a direction perpendicular to the direction of advance AvF of the film F.

It is understood that these screws 22 and nuts 21 thus make up means for adjusting the position and orientation of the beam 10 relative to the first rail R1 and the second rail R2.

Considering FIG. 8 again, it appears that the beam 10 is positioned close to the first rail R1, while being substantially parallel to this rail R1; due to the convergence of the rail R2 toward the rail R1 in the downstream direction, the movement of the members 2 and 4 along these respective rails R1, R2 leads to gradually opening the angle formed by the pairs of second connecting rods 11 connected to one another, such that the distance between two consecutive members 4 increases in the downstream direction, and therefore such that, in a manner multiplied by the connecting rods 10, the distance between two consecutive members 2 increases correlatively.

Comparing FIGS. 1 and 8, it appears that, in the device according the disclosed embodiments shown in FIG. 8, the lengths of the second connecting rods 11 are added to the lengths of the first connecting rods 5 as regards to the maximum possible gap between two consecutive grasping members 2, and that they thus make it possible to obtain a substantially higher longitudinal stretching rate relative to what was achieved by the existing devices as shown in FIG. 1.

Still in reference to FIG. 8, it is understood that the orientation of the beam 10 relative to the rails R1, R2 makes it possible to influence the evolution of the gap between the grasping members 2 along the rails R1, R2, and therefore to adjust the longitudinal stretching rate of the film F, with the possibility of producing a so-called negative longitudinal stretching rate, i.e., with the two successive grasping members 2 coming closer together in the downstream direction. Thus, if the beam 10 is oriented such that the downstream portion of this beam approaches the rail R2 in the downstream direction, said beam will make it possible to obtain a gradual opening of the angle between the successive pairs of second connecting rods 11 in the downstream direction, in addition to what is provided by the convergence of the rail R2 with the rail R1 in the downstream direction; the beam 10 will therefore make it possible to obtain an increase in the longitudinal stretching rate; on the contrary, if this same beam 10 is oriented such that a downstream portion of this beam moves away from the rail R2 in the downstream direction, said beam will provide a gradual closing of the angle between the successive pairs of second connecting rods 11 in the downstream direction, subtracted from the opening of these second connecting rods 11 provided by the convergence of the rail R2 with the rail R1 in the downstream direction; the beam 10 will therefore provide a decrease in the longitudinal stretching rate.

Figure 10:
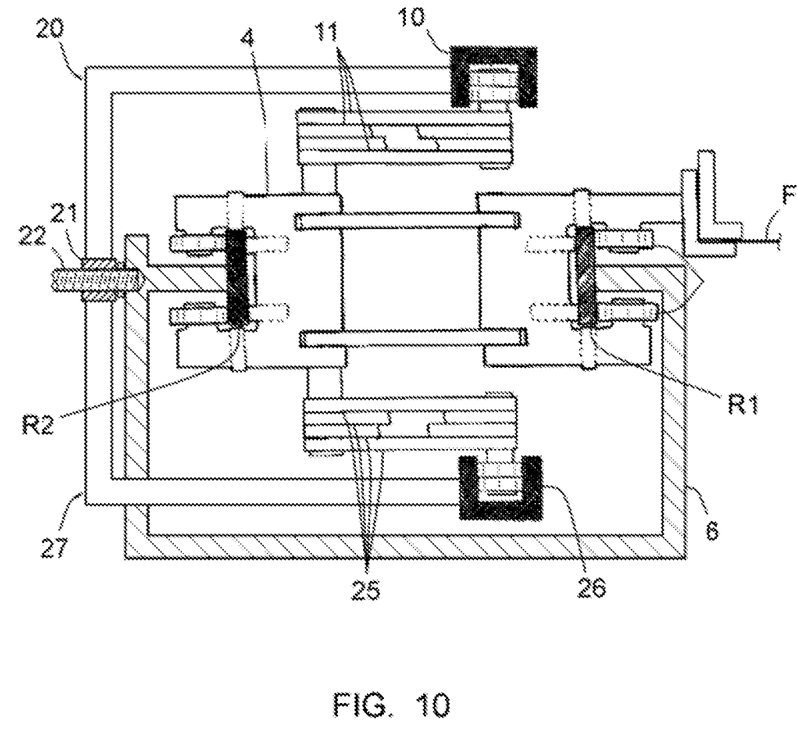
FIG. 10 is a view of the subassembly similar to FIG. 9, according to a second implementation.

FIG. 10 is a view similar to FIG. 9, also showing grasping members 2 including clamps 3 for grasping a lateral edge of the film F, engaged on the first rail R1; the guide members 4 engaged on the second rail R2; and first pairs of connecting rods 5 connecting a grasping member 2 to a guide member 4. FIG. 10 shows another alternative implementation in which the subassembly 1 comprises a second assembly of said second connecting rods 25 connected to a second adjusting beam 26, arranged on the side opposite that on which the first connecting rod 11/beam 10 assembly is arranged; this second assembly allows a better distribution of forces when the device is intended to withstand substantial forces. It appears that the posts 27 of the second assembly join the posts 20 of the first assembly at the nut 21 and that they can therefore be actuated simultaneously, using the same screw 22.

Figure 11:
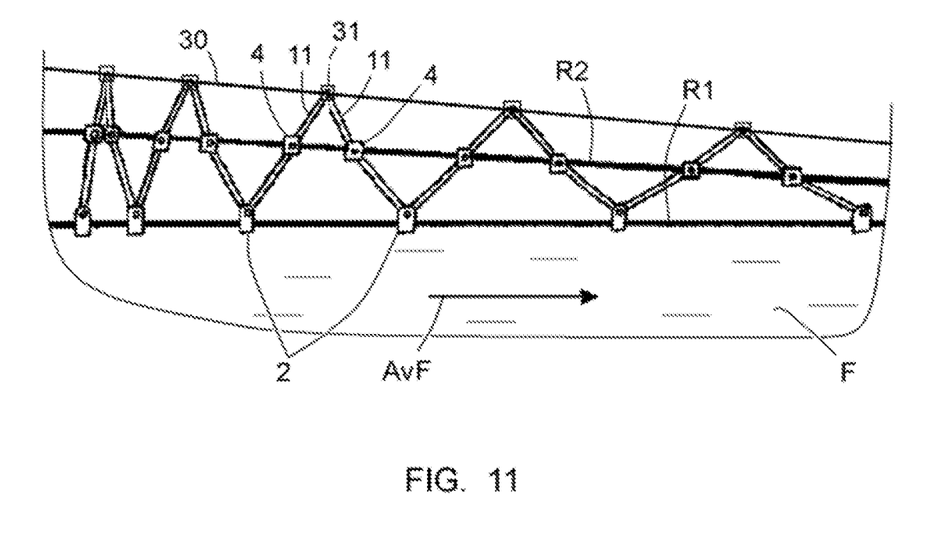
FIG. 11 is a view of said subassembly similar to FIG. 8, according to a second embodiment.
Figure 12:
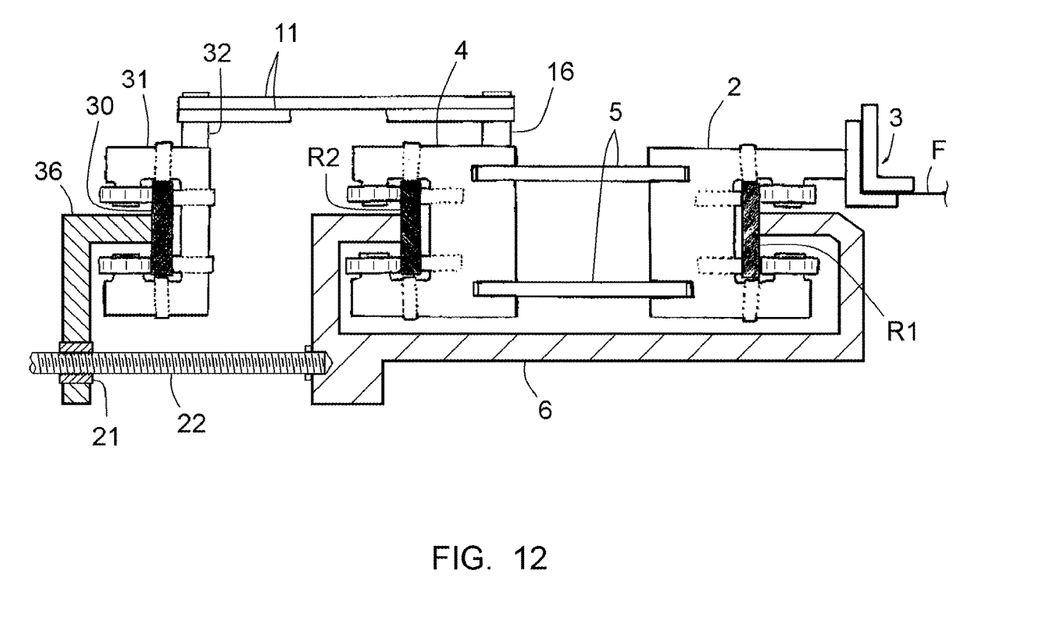
FIG. 12 is a cross-sectional view of this subassembly.

FIGS. 11 and 12 show a second embodiment of the device according to an invention; for simplification reasons, the parts or elements of the first embodiment already described above will be designated using the same numerical references and will not be described again. In this second embodiment, grasping members 2, clamps 3, first rail R1, guide members 4, second rail R2, first connecting rods 5, base 6, pivot 16 and connecting rods 11 as previously described can be found in the same way. As shown on FIG. 12, each pair of second connecting rods 11 extends on the side of the second rail R2 opposite the first rail R1. In this case, there is no beam 10, but instead, a rail 30 similar to said first or second rails R1, R2, having guide parts 31 engaged on it and movable along it, like the parts 4, each of these guide parts 31 being secured to a pivot 32 on which said second connecting rods 11 are pivotably mounted. The rail 30 is secured to bases 36 fastened to it at similar or identical intervals over its length, connected to nuts 21 engaged with screws 22, to adjust the position and orientation of the rail 30.

As appears from the preceding, the disclosed embodiments provide a device having the decisive advantages set out above relative to the similar devices of the prior art.

In particular, the device according to the disclosed embodiments allow, for optimal films, a very precise adjustment of the isotropy of the refraction index of the produced films, since for this type of film, a fixed transverse stretching rate is completely acceptable, as long as the possibility of adjusting the longitudinal stretching rate allows an orientation of the crystalline structures in the film by the desired angle, while guaranteeing extreme precision of the positioning of the clamps between the right side and the left side of the film.

For the membranes, and in particular for those intended to manufacture high-performance batteries, the device according to the disclosed embodiments make it possible to obtain perfect isotropy of the porosity of the film over the entire length of the film, which requires that for a given transverse stretching rate, which may be fixed with no drawbacks, the longitudinal stretching rate be distributed along the transverse stretching as a function of what is exactly necessary to obtain a 90° orientation over the entire film portion, and therefore the desired porosity isotropy.

The disclosed embodiments have been described above in reference to embodiments provided as examples. It is of course not limited to these embodiments, and the scope of protection is defined by the appended claims.

What is claimed is:

1. A device for stretching a thermoplastic film simultaneously in a longitudinal direction of the film and a transverse direction of the film, the device comprising, on each side of the film to be stretched,
   grasping members for grasping a lateral edge of the film, in particular in the form of clamps;
      a first guide rail and a second guide rail positioned one along the other, the first guide rail being closer to the film than the second guide rail, the grasping members being placed on the first guide rail and the grasping members being able to move along the first guide rail;
   guide members, the guide members being placed on the second guide rail and are able to move along the second guide rail, the second guide rail being connected to said first guide rail such that its position is not adjustable relative to said first guide rail in a direction transverse to the film; and
   first connecting rods connecting the grasping members and the guide members, the first connecting rods being movable relative to the grasping members and the guide members along first axes;
   wherein, on each side of the film,
      the device further comprises a first longitudinal adjusting beam, the length of which is such that the first longitudinal adjusting beam extends over a series of consecutive grasping members and consecutive guide members;
      each guide member is connected to a single grasping member by one first connecting rod or by several first connecting rods superimposed on each other, and is connected to the first longitudinal adjusting beam by one second connecting rod or by several second connecting rods superimposed on each other, wherein:
         the first longitudinal adjusting beam extends along the first and second guide rails;
         wherein each of the second connecting rods has a first end connected to a single guide member and a second end connected to said first longitudinal adjusting beam, said first end being movable relative to the single guide member and said second end is connected relative to this first longitudinal adjusting beam along a second axis parallel to said first axes;
         wherein each second connecting rod(s) of a first guide member and each second connecting rod(s) of a second guide member consecutive to said first guide member are connected to said first longitudinal adjusting beam at pivot points that are combined on this first longitudinal adjusting beam; and
         wherein the device includes assemblies comprising the first longitudinal adjustment beam connected to one or more screws via one or more posts, the one or more screws configured to allow for adjusting the position and orientation of said first longitudinal adjusting beam relative to said first and second guide rails, said assemblies being arranged at intervals along the length of the first longitudinal adjusting beam and configured to move portions of the first longitudinal adjusting beam connected to said assemblies in a direction perpendicular to a direction of advance of the film.

2. The device according to claim 1, wherein, on each side of the film, the device comprises:

a second longitudinal adjusting beam extending along the first and second guide rails, homologous to said first longitudinal adjusting beam and such that the second longitudinal adjusting beam extends over a series of consecutive grasping members and guide members, and a series of connecting rod corresponding to said second connecting rods, the second longitudinal adjusting beam and the series of connecting rods being situated on a side that is opposite a side of the grasping members, the first connecting rods, and the guide members on which said first elongated adjusting beam and the series of said second connecting rods are located.

3. The device according to claim 1, wherein each of the second connecting rods of the second guide member consecutive to said first guide member extend between the two said first connecting rods associated respectively with the first and second guide members.

4. The device according to claim 3, wherein said first longitudinal adjusting beam is in the form of a rail with an upside down U-shaped section, forming a first guide slot, and wherein the second ends of the two second connecting rods are linked to a first pivot which is guided by said first guide slot, the first guide slot and first pivot thus connecting the two second connecting rods to the first adjusting beam.

5. The device according to claim 1, wherein each of the second connecting rod(s) of the first guide member and the each second connecting rod(s) of the second guide member consecutive to said first guide member extends over a side of said second rail opposite said first rail.

6. The device according to claim 5, wherein said first longitudinal adjusting beam is in the form of a rail, having guide parts engaged on it and movable on it, each of the guide parts being secured to a pivot on which said second connecting rods are pivotably mounted.

7. The device according to claim 1, wherein the device further comprises a first linear motor associated with said first longitudinal adjusting beam acting on each junction point of said second connecting rods so as to assist a movement of the second connecting rods said first longitudinal adjusting beam during the longitudinal stretching operation of the film.

8. The device according to claim 1, wherein the one or more screws traverses the first longitudinal adjusting beam and a flank of a base of the first and second guide rails, such that the screw is rotatable relative to the flank, wherein a rotation of the one or more screws moves the first longitudinal adjusting beam perpendicular to the direction of advance of the film.

9. The device according to claim 2, wherein the second longitudinal adjusting beam is in the form of a rail with an upside U-shaped section, forming a second guide slot, and wherein ends of two consecutive connecting rods of said third connecting rods are linked to a second pivot which is guided by said second guide slot, the second guide slot and second pivot thus connecting the series of connecting rods to the second adjusting beam.

10. The device according to claim 2, wherein the device further comprises: a second linear motor associated with said second longitudinal adjusting beam acting on each junction point of said series of connecting rods so as to assist the movement of the series of connecting rods along said second longitudinal adjusting beam during the longitudinal stretching operation of the film.

* * * * *